(12) United States Patent
Weeks et al.

(10) Patent No.: US 9,046,270 B2
(45) Date of Patent: *Jun. 2, 2015

(54) CONTROLLABLE FLAMEHOLDER

(75) Inventors: Simon A. Weeks, Ashby-de-la-Zouch (GB); Christopher G. Bright, Nottingham (GB)

(73) Assignee: ROLLS-ROYCE plc, London (GB)

( * ) Notice: Subject to any disclaimer, the term of this patent is extended or adjusted under 35 U.S.C. 154(b) by 829 days.

This patent is subject to a terminal disclaimer.

(21) Appl. No.: 13/180,957

(22) Filed: Jul. 12, 2011

(65) Prior Publication Data

US 2012/0023950 A1 Feb. 2, 2012

(30) Foreign Application Priority Data

Jul. 28, 2010 (GB) .................................. 1012626.6

(51) Int. Cl.
*F02M 27/04* (2006.01)
*F02C 9/50* (2006.01)
(Continued)

(52) U.S. Cl.
CPC .................. *F23R 3/20* (2013.01); *F02M 27/04* (2013.01); *F02C 9/50* (2013.01); *F23C 99/001* (2013.01); *F23D 14/74* (2013.01)

(58) Field of Classification Search
CPC ............ F23C 99/001; F23R 3/18; F23R 3/20; F23R 3/22; F23R 3/002; F23R 3/10; F23R 3/12; F23R 3/16; F23R 3/286; F23R 3/30; F23R 3/32; F23R 2900/00008; F23R 2900/00009; F23D 14/74; F23D 14/84; F02M 27/04; F02M 27/045; F02M 27/047; F03H 1/00; F03H 1/0037; F03H 1/005; F03H 1/0062; F03H 1/0068; F03H 1/0075; F03H 1/0081; F03H 1/0087; F03H 1/0093; F02C 7/2365; F02C 7/25; F02C 9/16; F02C 9/50; F05D 2260/14; B64G 1/405
USPC ........ 60/734, 749, 39.11, 765, 763, 202, 204; 431/350, 349, 172, 171, 108, 8, 9, 12
See application file for complete search history.

(56) References Cited

U.S. PATENT DOCUMENTS 2,963,864 A * 12/1960 Gross .......................... 60/39.827
3,035,412 A * 5/1962 Poujade .......................... 60/776
(Continued)

FOREIGN PATENT DOCUMENTS

GB        1013015 A  * 12/1965  ............. H02K 43/00
GB        1131507 A  * 10/1968  ................ H01F 7/06
(Continued)

OTHER PUBLICATIONS http://en.Wikipedia.org/wikiMHD_generator, "MHD Generator," Wikipedia, Jun. 8, 2011, pp. 1-8.
(Continued)

*Primary Examiner* — Andrew Nguyen
*Assistant Examiner* — Jason H Duger
(74) *Attorney, Agent, or Firm* — Oliff PLC

(57) ABSTRACT

The present invention relates to a flameholder (1) for holding a flame (84) comprising a flow of combusting fluid. The flameholder (1) comprises an inlet (32) and an outlet (34) which defines a flow path between them. A magnetic-field generator (10, 20) is arranged to generate a magnetic field (40) across the flow path such that in use the fluid flows in the flow path through the magnetic field (40). As the fluid flows through the magnetic field an electric current is induced in the fluid. This results in a force (86) being generated on the fluid which opposes the flow direction (82). This force acts to hold the flame in place. If the flow path is in the form of a closed loop, in a plane perpendicular to the flow direction (82), then the current (50) induced in the fluid can flow in a closed loop entirely within the fluid.

23 Claims, 13 Drawing Sheets

(51) Int. Cl.
*F23R 3/20* (2006.01)
*F23C 99/00* (2006.01)
*F23D 14/74* (2006.01)

(56) References Cited

U.S. PATENT DOCUMENTS

| | | | | |
|---|---|---|---|---|
| 3,306,338 | A * | 2/1967 | Wright et al. | 431/202 |
| 3,319,106 | A * | 5/1967 | Hertz | 313/161 |
| 3,324,316 | A * | 6/1967 | Cann | 376/141 |
| 3,416,870 | A * | 12/1968 | Wright | 431/2 |
| 3,433,015 | A * | 3/1969 | Sneeden | 60/804 |
| 3,613,370 | A * | 10/1971 | Paine | 60/202 |
| 3,736,447 | A * | 5/1973 | Zauderer | 310/11 |
| 3,830,621 | A * | 8/1974 | Miller | 431/356 |
| 4,111,636 | A * | 9/1978 | Goldberg | 431/2 |
| 6,470,684 | B2 * | 10/2002 | Wilbraham | 60/737 |
| 6,798,141 | B2 * | 9/2004 | Kornfeld et al. | 315/111.21 |
| 6,834,492 | B2 * | 12/2004 | Hruby et al. | 60/202 |
| 7,137,808 | B2 * | 11/2006 | Branston et al. | 431/8 |
| 8,217,537 | B2 * | 7/2012 | Bright | 310/11 |
| 8,330,306 | B2 * | 12/2012 | Bright | 310/11 |
| 8,365,510 | B2 * | 2/2013 | Lugg | 60/39.01 |
| 2007/0020567 | A1 * | 1/2007 | Branston et al. | 431/8 |
| 2007/0261383 | A1 * | 11/2007 | Hartmann et al. | 60/39.01 |
| 2010/0186368 | A1 | 7/2010 | Ikeda | |
| 2010/0186414 | A1 * | 7/2010 | Lugg | 60/740 |

FOREIGN PATENT DOCUMENTS

| | | |
|---|---|---|
| JP | A-2008-064047 | 3/2008 |
| WO | WO 2009/008524 A1 | 1/2009 |

OTHER PUBLICATIONS

Rietjens, "The Future for MHD Power Generation", Physics Technology., 1979, pp. 216-221, vol. 10, The Institute of Physics, Great Britian.

P. C. Stangeby, "A Review of the Status of MHD Power Generation Technology Including Suggestions for a Canadian MHD Research Program," Institute for Aerospace Studies, Nov. 1974, UTIAS Review No. 39, University of Toronto.

Joseph, "Flame Amplification and a Better Hi-Fi Loudspeaker? Music from the Fireplace May be Around the Corner," Popular Electronics, May 1968, pp. 47-53.

British Search Report issued in British Application No. GB1012626.6 dated Aug. 25, 2010.

* cited by examiner

A-A

B-B

CONTROLLABLE FLAMEHOLDER

The invention relates to a flameholder, and particularly, although not exclusively, to a controllable magnetic flameholder for a gas turbine engine.

A gas turbine engine comprises a compressor, a combustion chamber and a turbine. The compressor draws in air and pressurises it. This pressurised air is then fed to the combustion chamber where it is combusted with fuel. This causes the temperature and volume of the air to increase. The high-pressure, high-temperature air then expands through the turbine, thereby generating energy.

Figure 1:
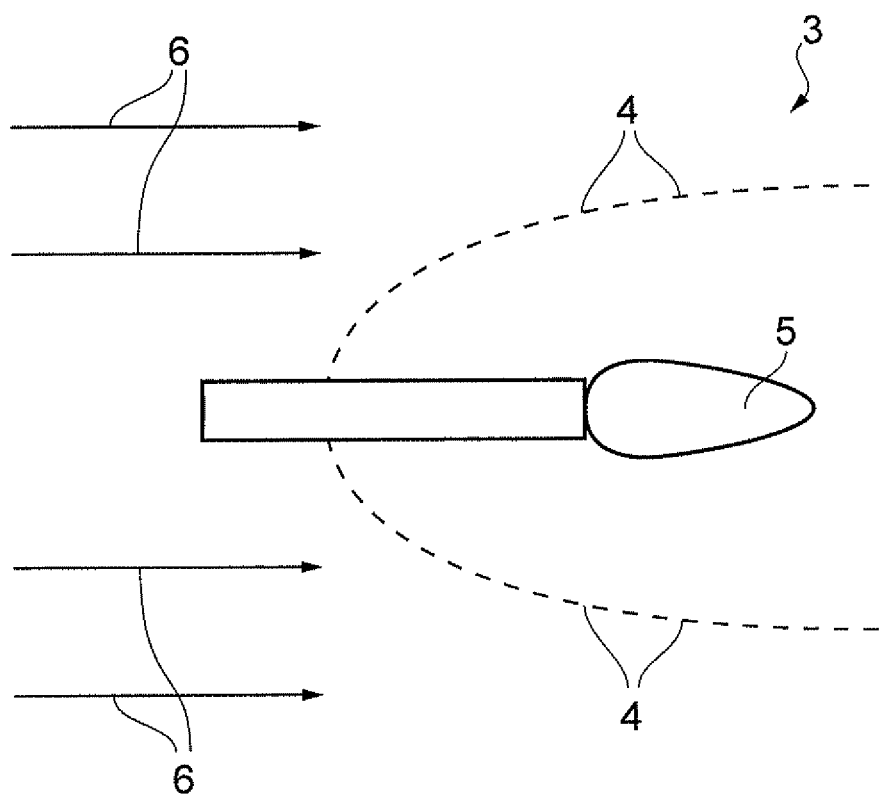

In the combustion chamber a flame is generated by the combustion of fuel. Because of the fast flow of air through the combustion chamber it is necessary to shield the flame in order to prevent it from being extinguished. It is known to use a device known as a flameholder (or flame can) for this purpose. As shown in FIG. 1, one type of flameholder comprises a perforated metal can 3 which shields the flame 5 from the flow of air 6 through the combustion chamber. The perforations 4 in the can allow air into the can 3 so as to maintain combustion. The perforations 4 in the can are designed so as to allow just enough air into the can for stoichiometric combustion.

The above described flameholder is simple and is satisfactory for some circumstances. However, it is inflexible because the flameholding is not controllable.

It is therefore desirable to provide a flameholder which allows the flameholding to be controlled.

According to a first aspect of the present invention there is provided a flameholder for holding a flame comprising a flow of combusting fluid, comprising: an inlet and an outlet defining a flow path between them; and a magnetic-field generator arranged to generate a magnetic field across the flow path, the magnetic-field generator comprises a first pole piece having a cavity within which a second pole piece is located in such a way that an opening is formed between the first and second pole pieces which in use provides the flow path for the fluid and across which the magnetic field is generated; wherein in use the fluid flows in the flow path through the magnetic field, which then induces a flow of electric current in the fluid, thereby generating a force on the fluid which opposes the flow direction, wherein the induced current is in the form of a closed loop in a plane perpendicular to the flow direction such that in use the induced current can flow in a closed loop entirely within the fluid.

The force generated on the fluid which opposes the flow direction acts to hold the flame in place, thereby preventing the flame from being blown out. Because the current flows entirely within the fluid it is not necessary to provide electrodes which would be susceptible to erosion and would need to be replaced periodically.

In one embodiment the first pole piece is generally annular and the second pole piece is generally cylindrical, the first and second pole pieces being concentric, so that the flow path is annular in a plane perpendicular to the flow direction.

In a preferred arrangement the magnetic-field generator comprises first and second electromagnets, each including a pole piece and a winding. The electromagnets may be superconducting electromagnets and comprise superconducting windings. The use of electromagnets allows the strength of the flame-holding force to be controlled. The magnetic-field generator may generate an alternating magnetic field for various electromagnetic effects. This may help to suppress combustion instabilities such as rumble. The alternating magnetic field may have an alternating component and a steady component and the steady component is always in the same direction, this helps to prevent the flame from being blown out. The alternating magnetic field may be a combination of two or more frequencies.

In one embodiment the magnetic-field generator is arranged to generate a magnetic field that is stronger in the region of the outlet than the inlet. This promotes a current, and hence a flame-holding force, to be formed at the outlet as opposed to the inlet. The magnetic field generator may be arranged to generate a magnetic field that is stronger in the region of the inlet than the outlet.

The first pole piece may have a recess on an inner surface and a winding is located in the recess. The second pole piece may have a recess on an outer surface and a winding is located in the recess.

The magnetic field generator may be positioned closer to the outlet than the inlet. The winding(s) may be positioned closer to the outlet than the inlet. The magnetic field generator may be positioned closer to the inlet than the outlet. The winding(s) may be positioned closer to the inlet than the outlet.

At least one fuel burner may be located within the inlet between the first pole piece and the second pole piece. A plurality of fuel burners may be located within the inlet between the first pole piece and the second pole piece.

The first pole piece and/or the second pole piece may have at least one cooling duct for the passage of a cooling fluid to cool the first pole piece and/or the second pole piece.

The at least one fuel burner may be positioned upstream of the magnetic field generator. The at least one fuel burner may be positioned upstream of the winding(s).

The inlet of the flameholder may have an end cap, the end cap having a plurality of apertures and each aperture has a respective one of the plurality of fuel burners, the outlet of the flameholder has a plurality of spokes extending between the first pole piece and the second pole piece. Each spoke comprises a ferromagnetic core and an insulating refractory coating.

The invention is also concerned with a gas turbine engine including a flameholder according to any statement herein.

According to a second aspect of the invention there is provided a method of holding a flame, comprising: causing a flame comprising a flow of combusting fluid to flow along a flow path from an inlet to an outlet; and generating a magnetic field across the flow of the fluid in such a way that current is induced in the fluid, thereby generating a force on the fluid which opposes the flow direction, the induced current flows in the form of a closed loop in a plane perpendicular to the flow direction and the induced current flows in a closed loop entirely within the fluid. The closed loop may be generally annular.

In a particularly preferred arrangement the magnetic field is an alternating magnetic field. The alternating magnetic field may have an alternating component and a steady component and the steady component is always in the same direction. The alternating magnetic field may be a combination of two or more frequencies.

The magnetic field may be stronger in the region of the outlet than the inlet.

The invention may comprise any combination of the features and/or limitations referred to herein, except combinations of such features as are mutually exclusive.

Figure 2:
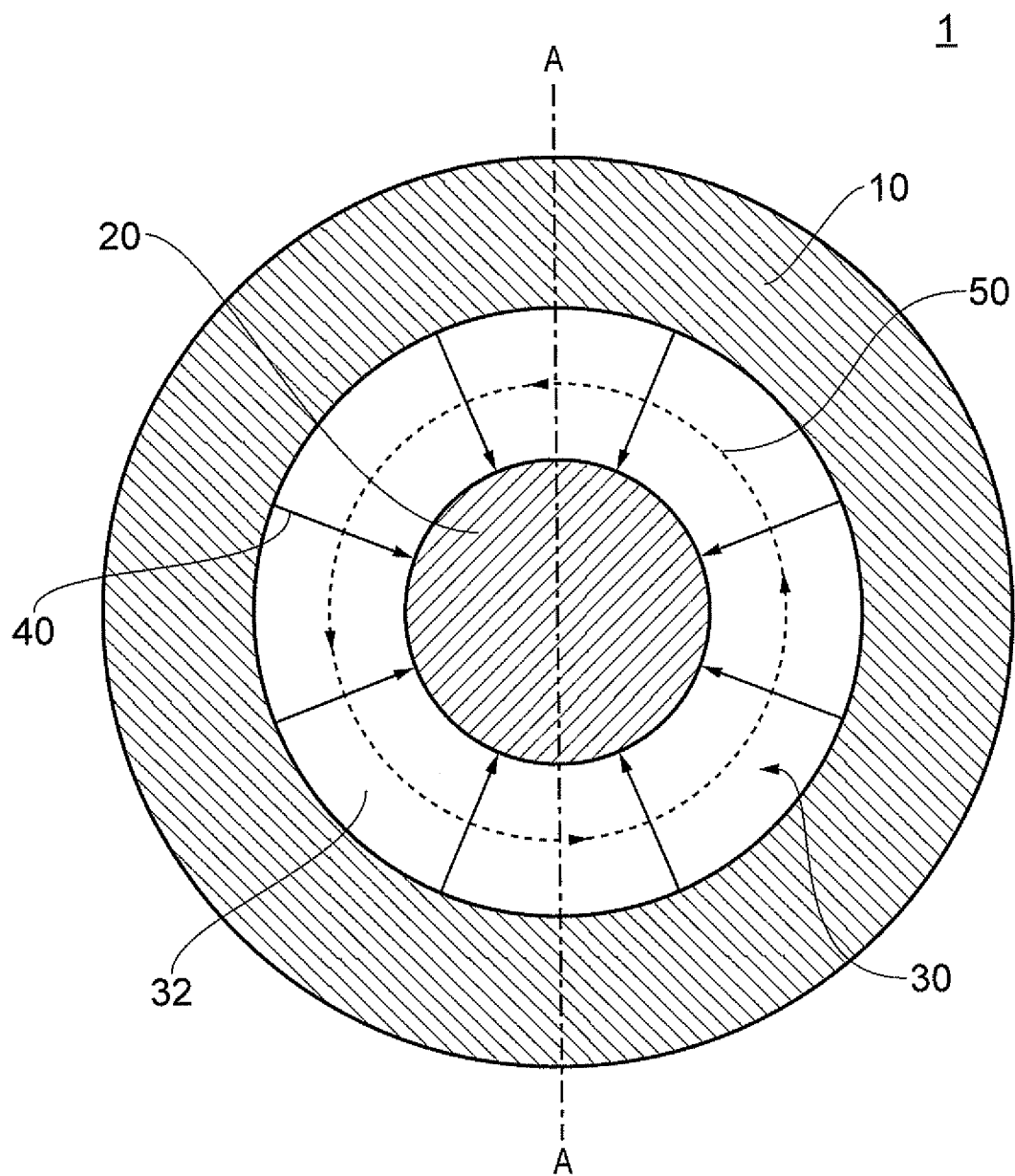
Figure 3:
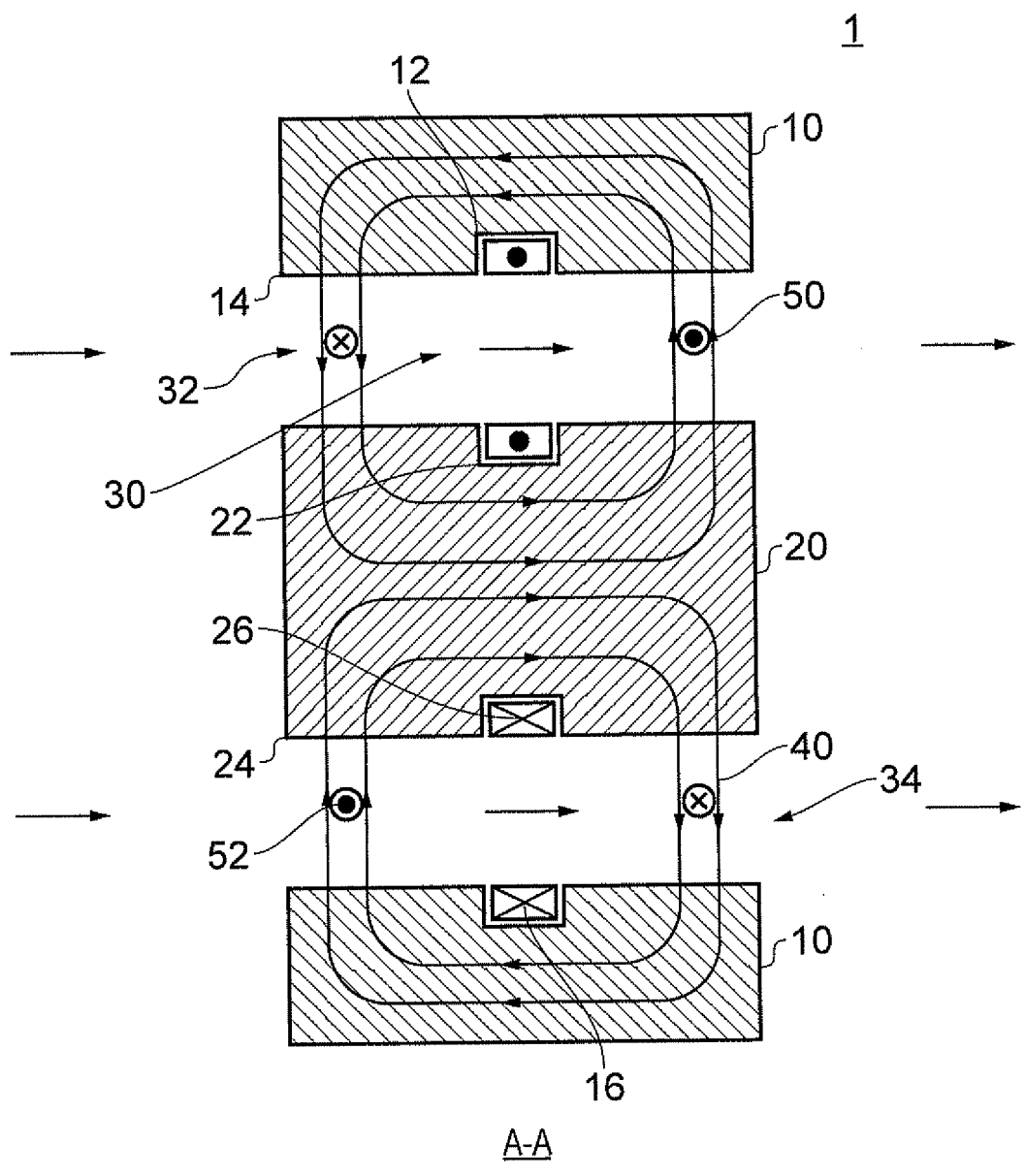
Figure 4:
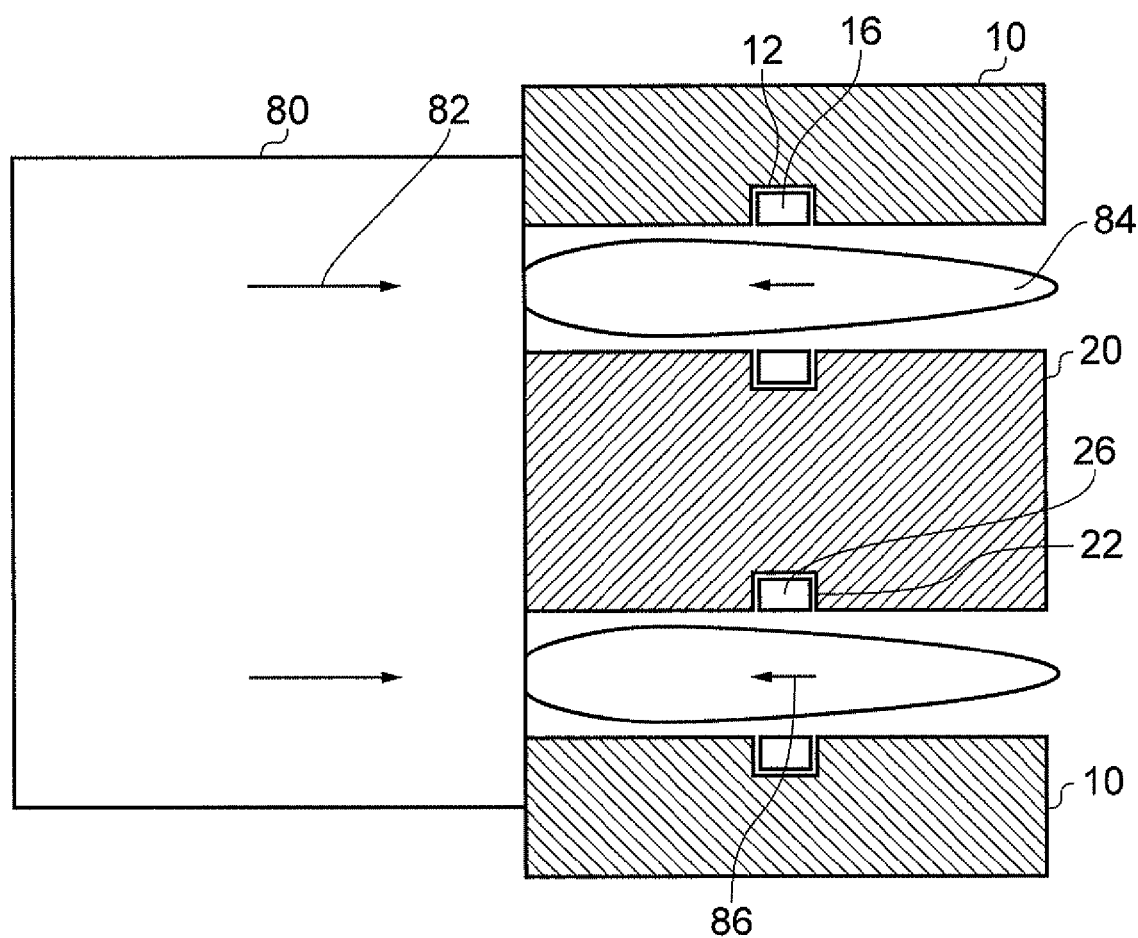
Figure 5:
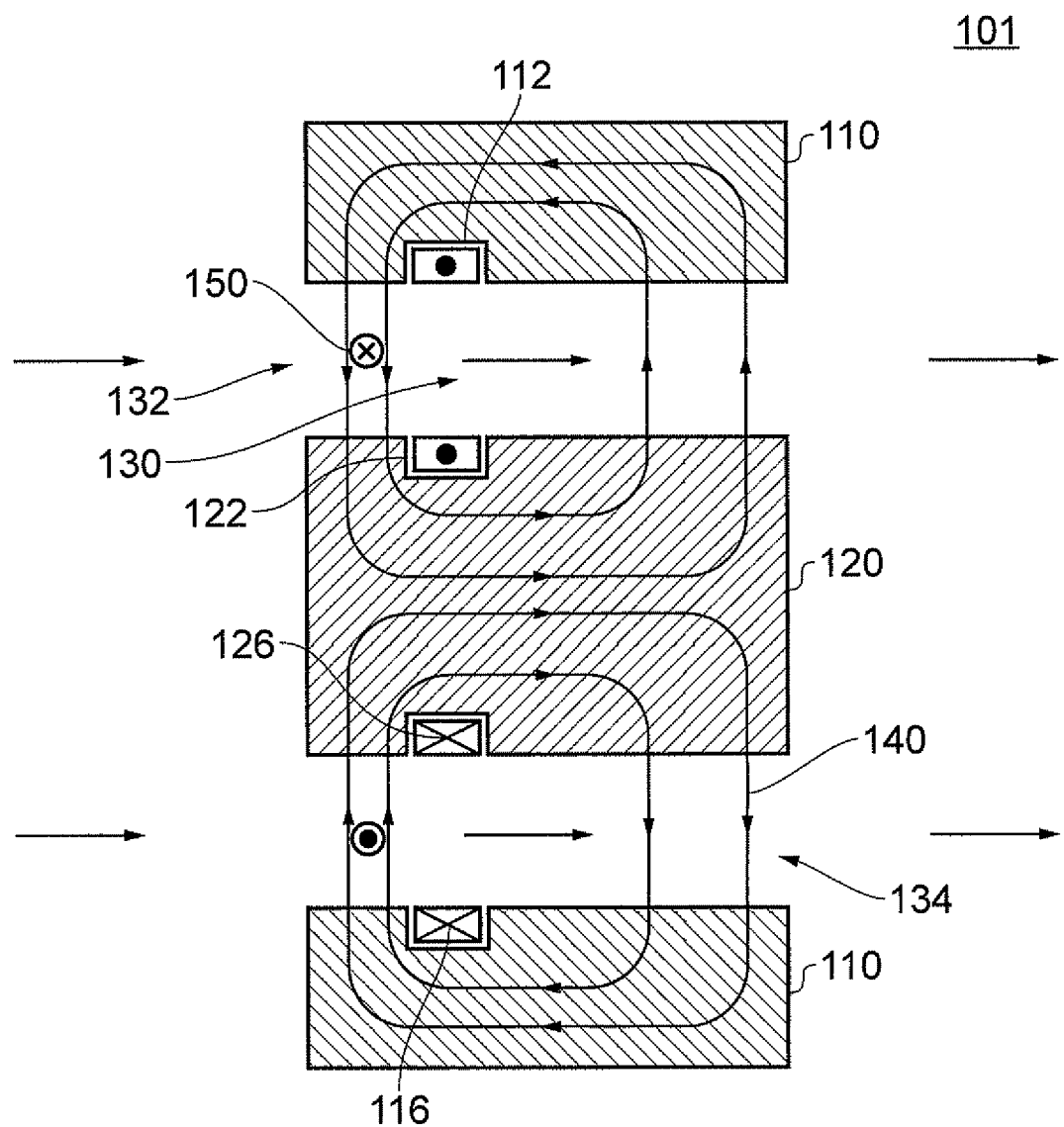
Figure 6:
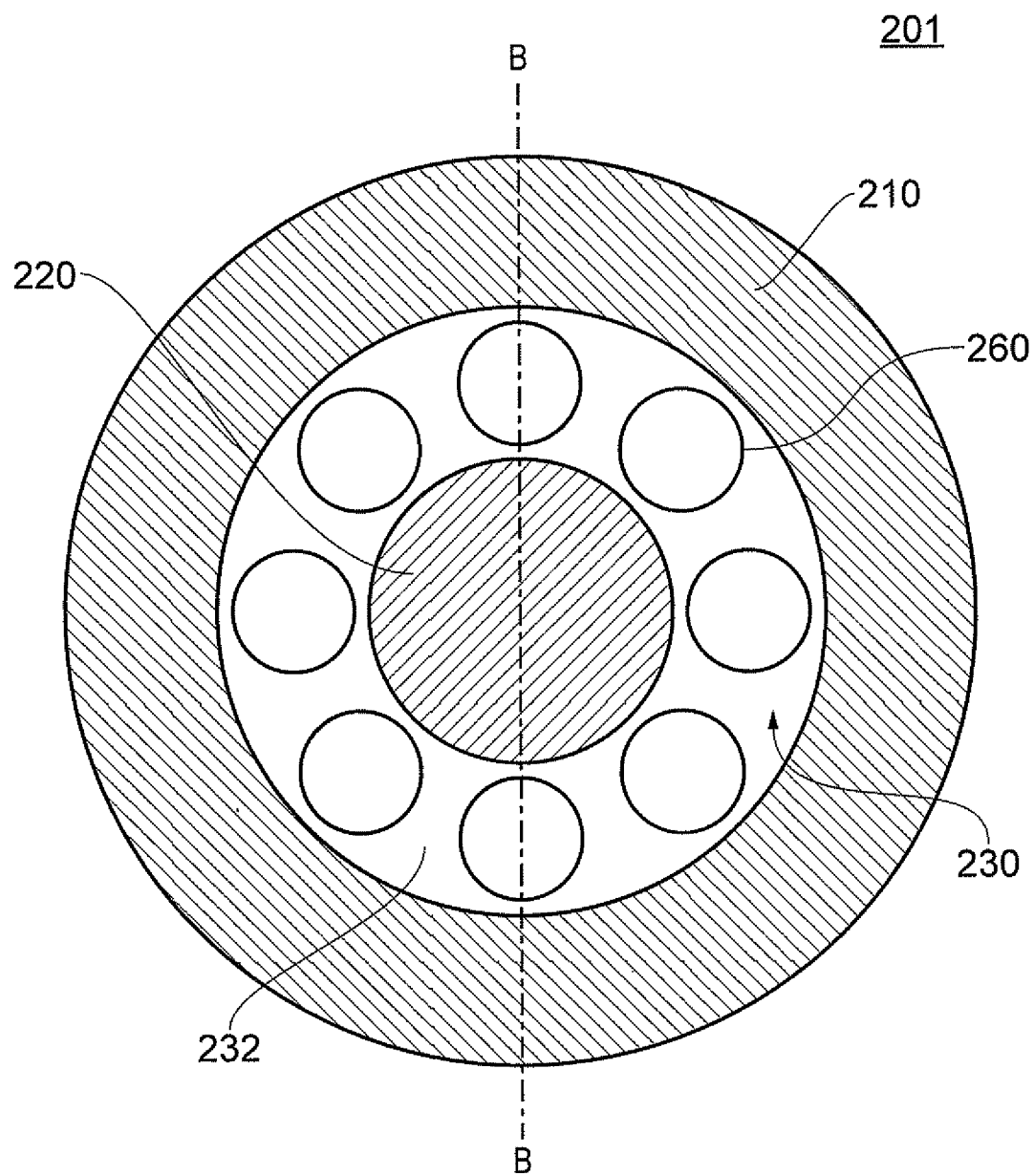
Figure 7:
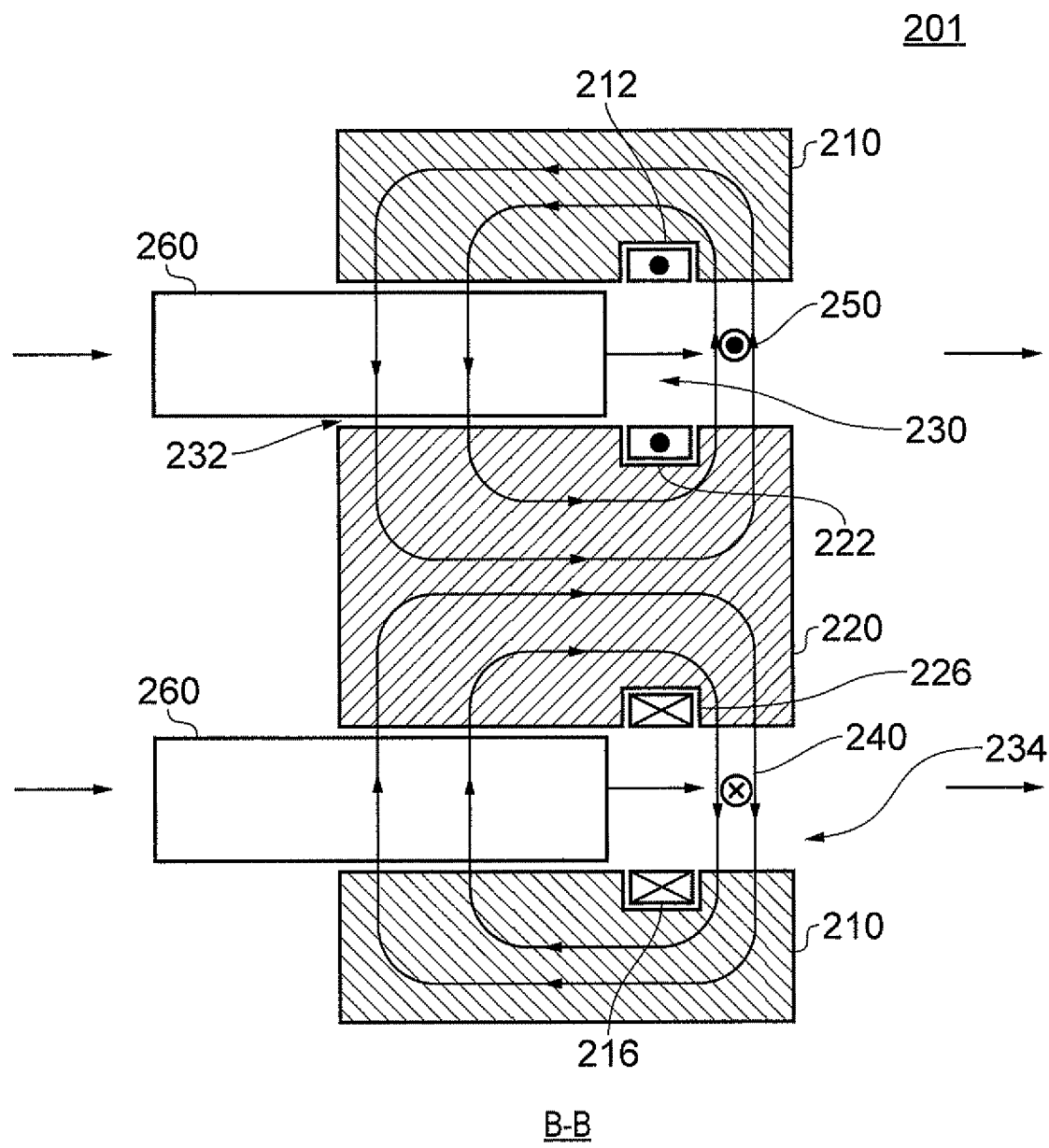
Figure 8:
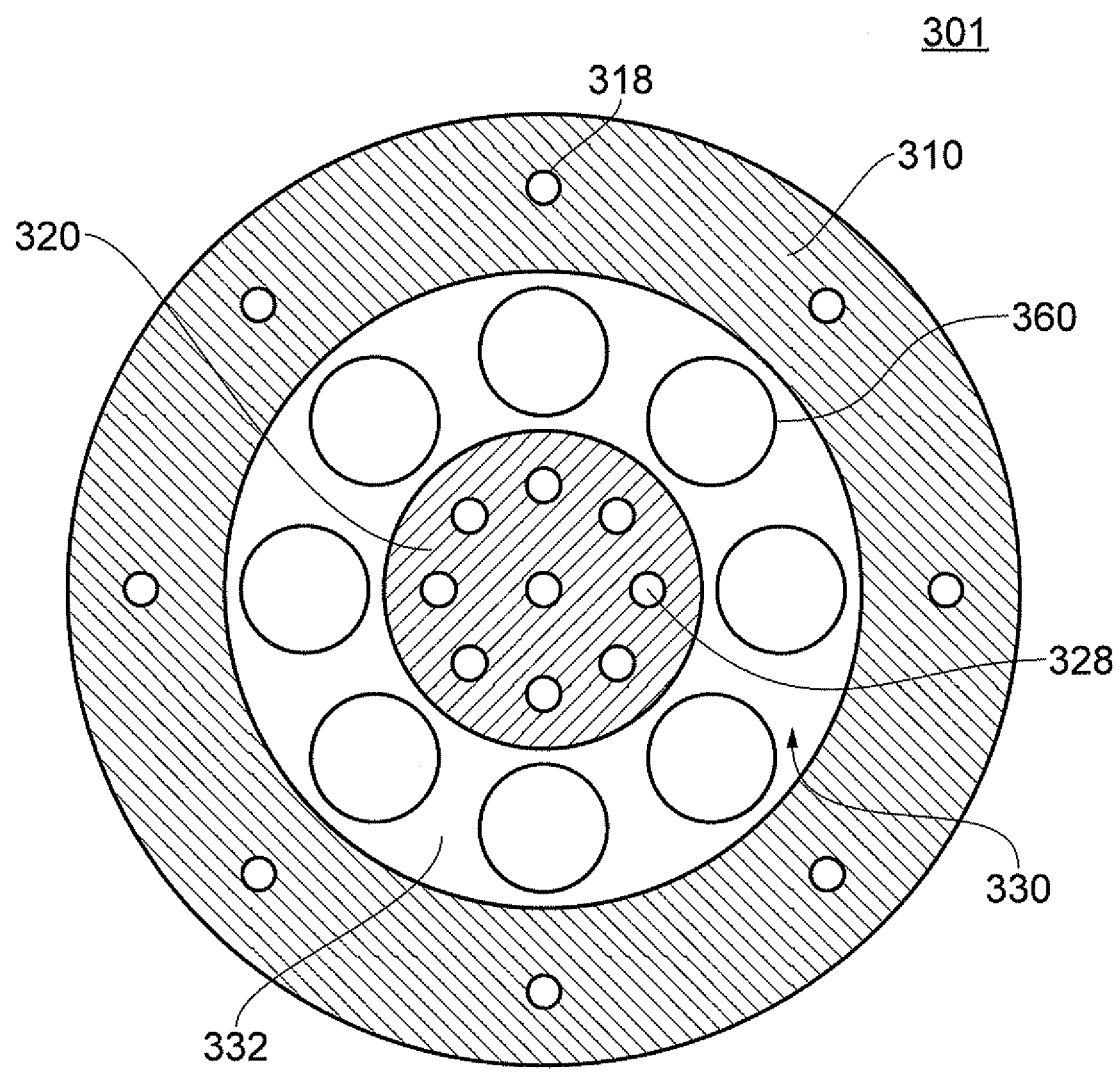
Figure 9:
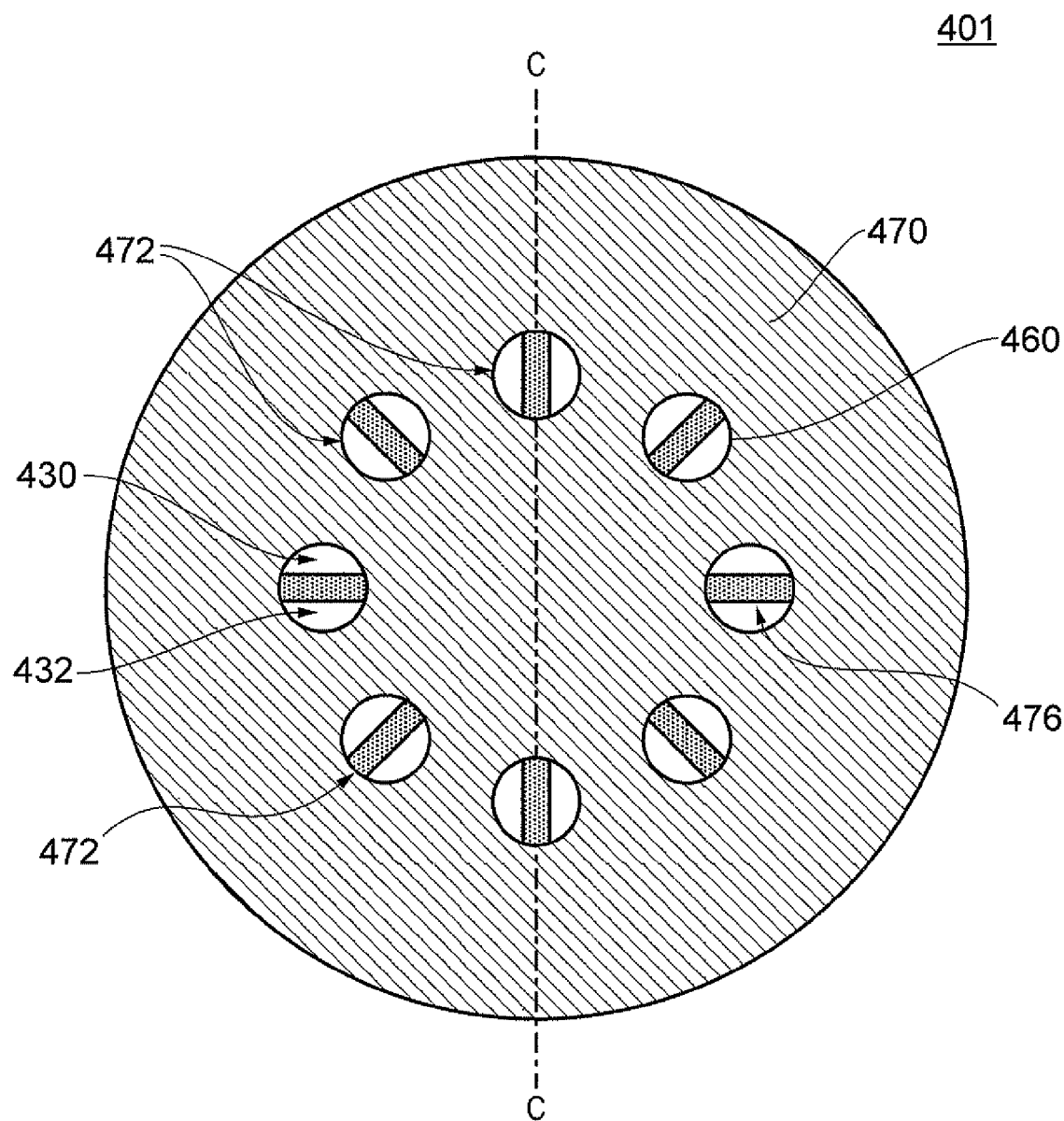
Figure 10:
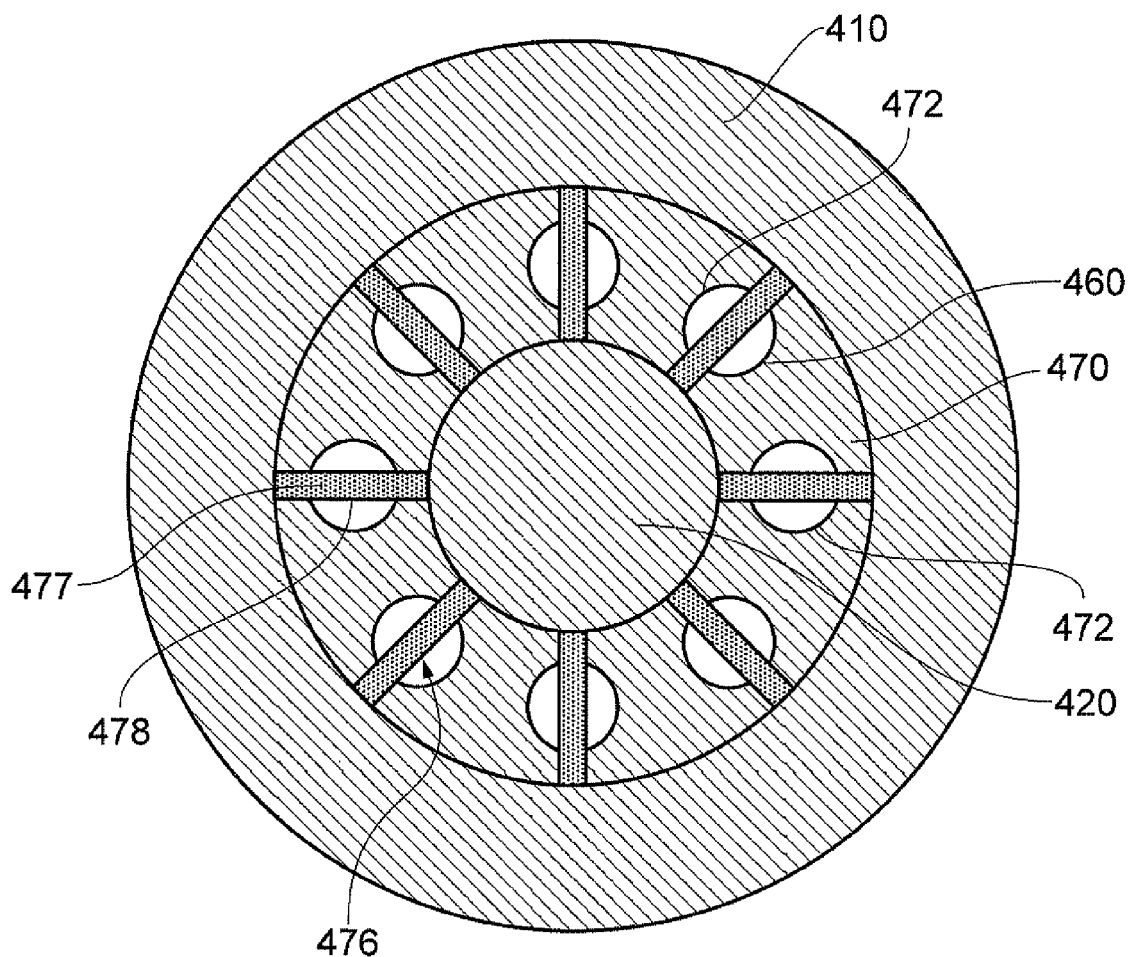
Figure 11:
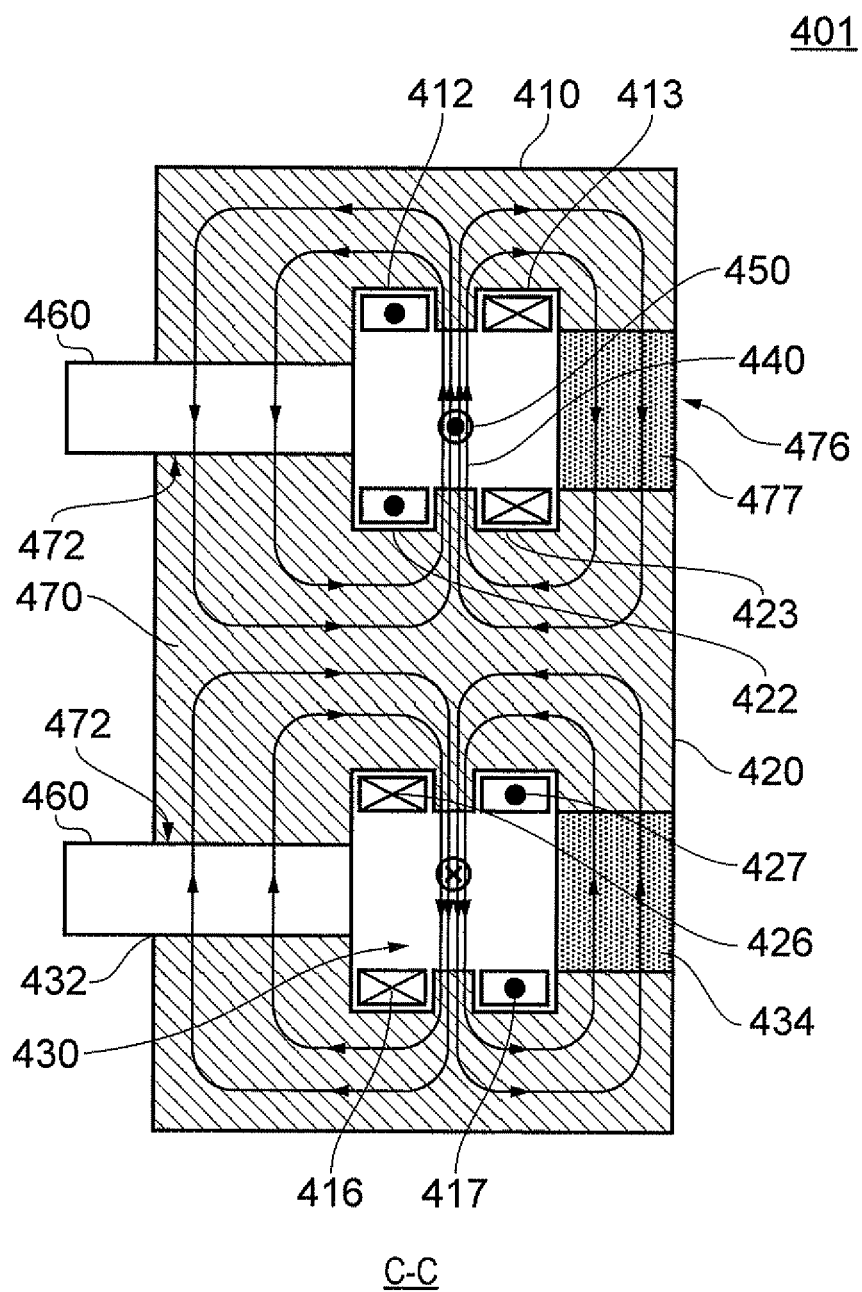

Embodiments of the present invention will now be described, by way of example only, with reference to the accompanying drawings, in which:

FIG. 1 schematically shows a previously considered flameholder;

FIG. 2 schematically shows a magnetic flameholder according to a first embodiment of the present invention;

FIG. 3 schematically shows the cross section A-A of FIG. 2;

FIG. 4 schematically shows the flameholder of FIG. 2 positioned at the opening of a fuel supply conduit;

FIG. 5 schematically shows a magnetic flameholder according to a second embodiment of the present invention;

FIG. 6 schematically shows a magnetic flameholder according to a third embodiment of the present invention;

FIG. 7 schematically shows the cross section B-B of FIG. 6;

FIG. 8 schematically shows a magnetic flameholder according to a fourth embodiment of the present invention;

FIG. 9 schematically shows an inlet end view of a magnetic flameholder according to a fifth embodiment of the present invention;

FIG. 10 schematically shows an outlet end view of a magnetic flameholder according to a fifth embodiment of the present invention;

FIG. 11 schematically shows the cross section C-C of FIG. 9; and

Figure 12:
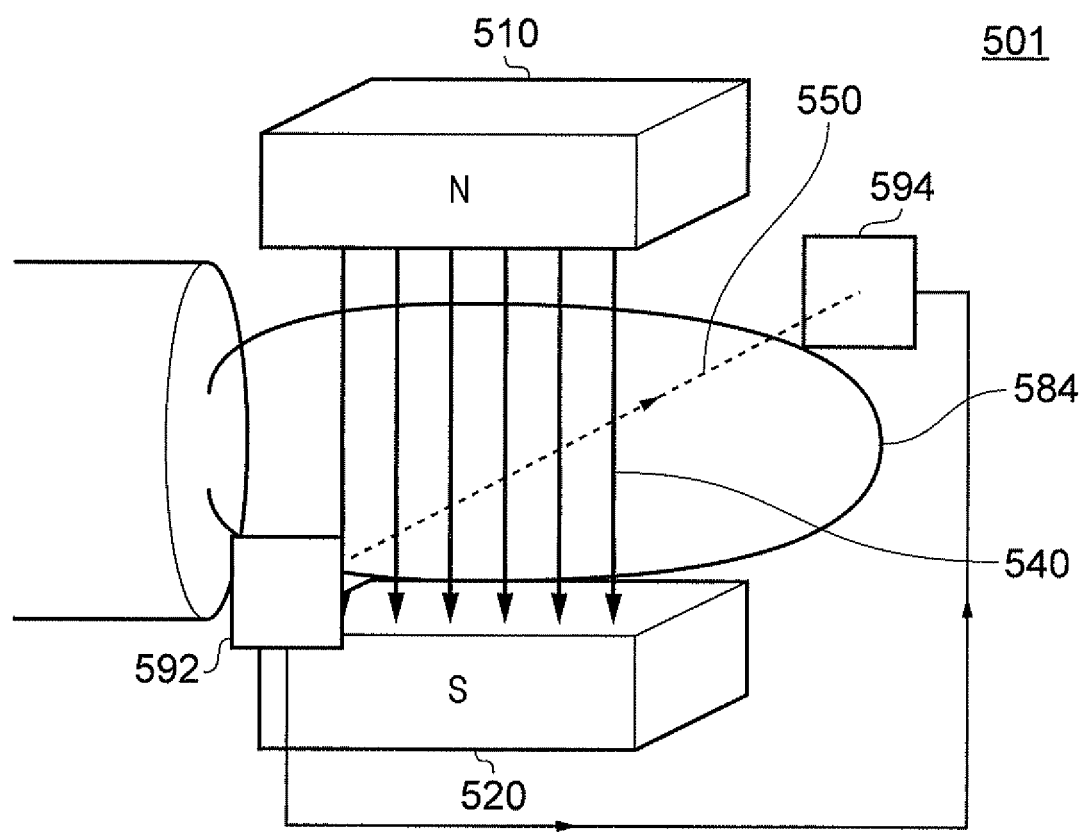

FIG. 12 schematically shows a sixth embodiment of the invention.

Figure 13:
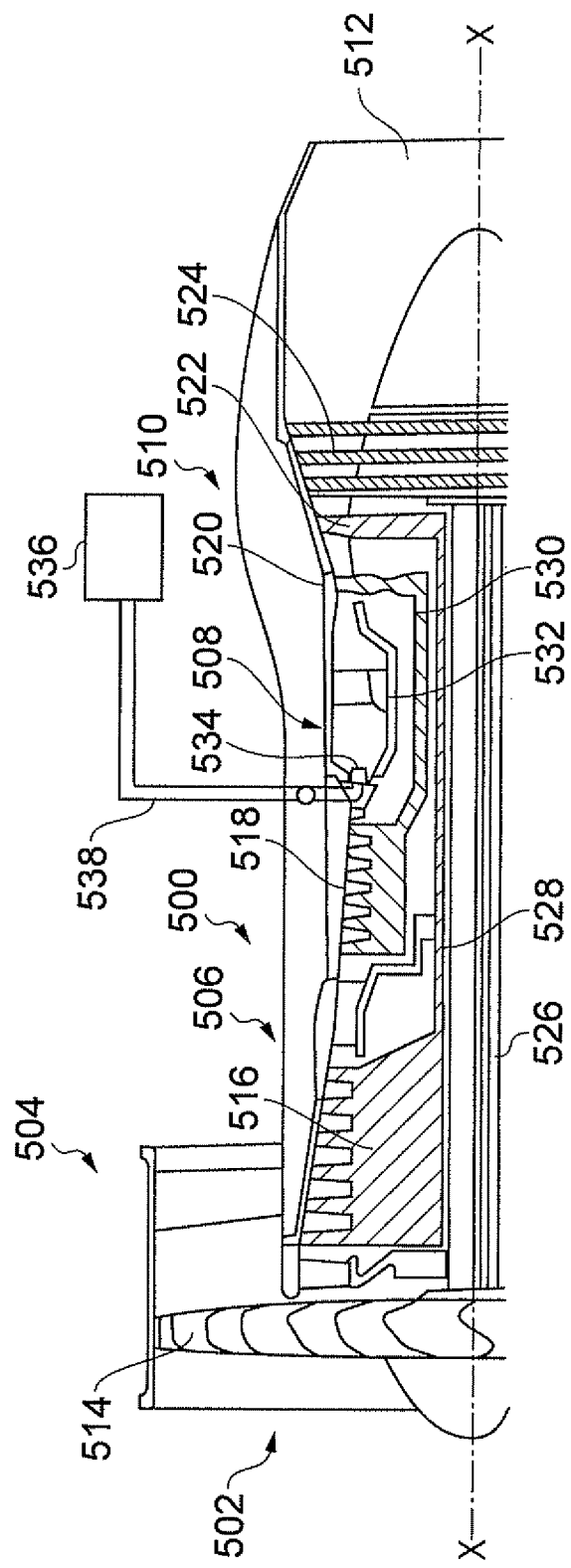

FIG. 13 shows a gas turbine engine having a flameholder according to the present invention.

FIGS. 2 and 3 show a first embodiment of a magnetic flameholder 1. The flameholder 1 comprises a magnetic-field generator in the form of an outer annular pole piece 10 and an inner cylindrical pole piece 20. The outer and inner pole pieces 10, 20 are concentric with one another and an annular opening (or gap) 30 between them defines a flow path having an inlet 32 and an outlet 34.

Referring now to FIG. 3, the outer pole piece 10 comprises an annular recess 12 on an inner surface 14 and the inner pole piece 20 comprises an annular recess 22 on an outer surface 24. An outer winding 16 is located in the recess 12 of the outer pole piece 10 and an inner winding 26 is located in the recess 22 of the inner pole piece 20. The windings 16, 26 are connected to a controller (not shown) which supplies a flow of current to the windings 16, 26. This produces a radial magnetic field 40 between the pole pieces 10, 20. The direction of the magnetic field 40 depends on the direction of the flow of current in the windings 16, 26.

The pole pieces 10, 20 may be made of any suitable material such as a low-loss magnetic material. Examples include laminated electric steels and high-resistivity magnetic materials such as ferrite. Spacers, struts or supports (not shown) may be provided in the gap between the inner pole piece 20 and the outer pole piece 10 in order to maintain the relative positions of the inner and outer pole pieces. The spacers, struts or supports may carry electrical connections to the windings 16, 26. As shown in FIG. 4, in use the flameholder 1 is positioned at the opening of a fuel supply conduit 80 that supplies combustible fluid flowing in a first direction 82. The fluid flows through the annular opening 30 of the flameholder 1 and when ignited generates a flame 84 that is positioned in the region of the annular opening 30.

The flame 84 is considered to be a region where combustion of the combustible fluid occurs. There is flow of particles through this region that include fuel particles and products of combustion. The flame 84 can therefore be considered to be a flow of combusting fluid. The term 'flame flow' will be used to mean a flow of combusting fluid.

Due to the heat generated by combustion of the fluid, the fluid undergoes thermal ionization. This means that the flame is capable of conducting current.

With reference to FIGS. 2 and 3 the annular flame flow in the annular opening 30 interacts with the radial magnetic field 40 generated between the windings 16, 26 of the outer and inner pole pieces 10, 20 as follows.

The flame 84 flows perpendicularly through the magnetic field 40 in the annular gap 30. Since the flame 84 is an ionized gas, a current 50 is induced in the flame 84 in a direction perpendicular to both the flow direction 82 and the magnetic field 40. As shown in FIG. 2, this results in an annular current 50 flowing in the annular flame 84. In this embodiment two annular currents 50, 52 are induced in the flame 84, one at the inlet 32 and one at the outlet 34 of the flameholder 1. Since the direction of the magnetic field is opposite at the inlet 32 and the outlet 34, the annular currents 50, 52 flow in opposite directions.

The annular current flows 50, 52 interact with the magnetic field to produce a Lorentz force 86 on the flame 84. This force is mutually perpendicular to the current flow 50 and the magnetic field 40 and is in the opposite direction to the flame flow. This Lorentz force 86 holds the flame 84 in the desired position and is known as the flame-holding force.

The flame-holding force 86 can be altered by changing the strength of the magnetic field 40 in the annular opening 30. This is can be done by changing the current supplied to the windings 16, 26. The magnetic flameholder 1 therefore allows the position of the flame to be readily controlled.

The magnetic flameholder 1 is able control combustion instabilities that are known as 'rumble'. This can be done by supplying AC current to the windings 16, 26. The waveform of the AC current is chosen to produce a varying magnetic field 40 that reduces or suppresses rumble. It may be desirable to superimpose an AC current on a DC current so that the magnetic field is always in the same direction.

It is also possible to suppress rumble by supplying two or more AC currents of different frequencies to the windings 16, 26. For example, if two frequencies f1 and f2 are used, non-linear effects in the annular currents 50, 52 will generate additional frequencies including the sum frequency (f1+f2) and the difference frequency (f1−f2) of the original two frequencies. Heterodyne operation could therefore be used to improve the performance of the magnetic flameholder.

For example, if the magnetic flameholder 1 operates efficiently over a band of frequencies including f1 and f2, but rumble control is required at a different frequency fr, the frequencies f1 and f2 can be chosen so that the frequency fr required for rumble control is the sum or the difference of the frequencies f1, f2. For example, if rumble control at fr=20 Hz is required but the magnetic flameholder operates more efficiently in the kilo hertz band, f1 can be made 2020 Hz and f2 can be made 2000 Hz so that the difference between f1 and f2 is the frequency required for rumble control (i.e. fr=f1−f2=20 Hz).

Heterodyne operation could be achieved by using transformers, filters or other suitable devices to supply two or more AC voltages to the windings 16, 26.

In order to improve the electrical conductivity of the flame 84 the combustible fluid may be seeded with easily ionisable materials such as alkali or alkaline-earth metals or their compounds.

The performance of the magnetic flameholder 1 can also be improved by further ionisation of the flame 84 within the flameholder 1. This may be done by irradiating the flame 84 with electromagnetic radiation such as microwaves, ultraviolet, X-rays or gamma rays, for example, or with corpuscular radiation such as alpha rays, beta rays, or beams of ions, for example. The flame may also be seeded with chemicals such as alkali metals or their compounds or with radioactive substances. Modulating the means of ionisation may also improve the combustion and may also improve the control of combustion instabilities such as rumble by tuning the modulation to relevant frequency components in the rumble.

Rumble may be a particular problem when burning fuel of having a low or a variable calorific value, such as municipal refuse or coal having a high ash content.

Heterodyning could be applied to the means of ionization in a similar way as described above for heterodyne control of the current in the windings. Also, heterodyne operation could also be achieved or assisted by varying the current in the windings at one frequency and the means of ionisation at a different frequency.

FIG. 5 shows a second embodiment of a magnetic flameholder 101 in which only one annular current 150 is induced in the flame, in the region of the inlet 132. This is done by positioning the windings 116, 126 on the outer and inner pole pieces 110, 120 closer to the inlet 132 than the outlet. This means that the magnetic field 140 is stronger at the inlet 132 and therefore an annular current 150 is induced in the flame in this region. The magnetic field 140 towards the outlet 134 is too weak to induce an annular current in this region or the annular current induced is small.

FIGS. 6 and 7 show a third embodiment of a magnetic flameholder 201 in which only one annular current 250 is induced in the flame 84, in the region of the outlet 234. This is done by positioning the windings 216, 226 on the outer and inner pole pieces 210, 220 closer to the outlet 234 than the inlet 232. This means that the magnetic field 240 is stronger at the outlet 234 and therefore an annular current 250 is induced in the flame in this region. The magnetic field 240 towards the inlet 232 is too weak to induce an annular current in this region or the annular current induced is small.

The above described arrangement allows fuel burners 260 to be located in the annular opening 230 at the inlet 232. This provides a more compact arrangement. A gap is provided between the pole pieces 210, 220 and the burners 260 to allow air to be drawn into the flameholder 201. In order to improve the magnetic circuit of the flameholder 201, the burners 260 can be made of a low-loss magnetic material such as laminated electric steels, or high-resistivity magnetic materials such as ferrite. This reduces losses due to eddy currents and magnetic hysteresis.

FIG. 8 shows a fourth embodiment of a magnetic flameholder 301. The inner and outer pole pieces 310, 320 are provided with cooling ducts 318, 328. These cooling ducts 318, 328 are supplied with a cooling fluid, such as air, which acts to cool the pole pieces 310, 320. As the air cools the pole pieces 310, 320 its temperature increases. This therefore preheats the air which is then used in the combustion process, thus saving energy. The electrical conductors in the windings may be made hollow for the circulation of cooling fluid.

FIGS. 9, 10 and 11 show a fifth embodiment of a magnetic flameholder 401. The inlet 432 end of the opening 430 has an end cap 470 that has holes 472 in it for burners 460. The end cap 470 is integrally formed with the outer and inner pole pieces 410, 420. The outlet 434 end of the opening 430 has an arrangement of spokes 476 that bridge the gap between the outer and inner pole pieces 410, 420. Each spoke 476 comprises a ferromagnetic core 477 and an insulating refractory coating 478. The end cap 470 and the spokes 476 allow magnetic flux to pass more easily between the outer and inner pole pieces 410, 420.

As shown in FIG. 11, the outer pole piece 410 has two annular recesses 412, 413 and the inner pole piece 420 has two annular recesses 422, 423. First and second outer windings 416, 417 are located in the recesses 412, 413 of the outer pole piece 410 and first and second inner windings 426, 427 are located in the recesses 422, 423 of the inner pole piece 420. Current is supplied to the first outer winding 416 and the first inner winding 426 in the same direction, and an opposite flow of current is supplied to the second outer winding 417 and the second inner winding 427. This produces a concentrated magnetic field 440 in a region between the first and second recesses. In use, an annular current 450 is therefore induced in the flame in this region, thus generating a Lorentz force in the opposite direction to the flow of the flame. This flame-holding force acts to hold the flame in place.

The high-temperatures that the magnetic flameholder 1 is exposed to during use may adversely affect its performance. There are a number of ways of mitigating this. These include: coating the surfaces with refractory materials such as thermal barrier coatings, using high-temperature insulation in the electrical windings such as glass fibre, applying similar techniques to those used in fire-resistance cables to protect the electrical windings, using high-temperature conductors such as tungsten for the windings.

Although in the foregoing embodiments it has been described that the magnetic field is generated by electromagnets, it is possible to make the pole pieces 10, 20 either partially or entirely out of permanent magnets. Also, it is not essential that the flow path defined by the opening 30 is annular. In other embodiments the flow path in a direction perpendicular to the flow direction may be a closed loop of any shape such that current can flow entirely in the flame.

However, with reference to FIG. 12, in yet a further embodiment the current 550 induced in the flame does not flow in a closed loop within the fluid. Instead, electrodes 592, 594 are provided that allow the flow of current 550 through the flame 584. However, the basic principle is the same. The flame 584 flows through a magnetic field 540 generated a magnetic-field generator, shown schematically, comprising two permanent magnets 510, 520, although other techniques of generating a magnetic field may be used. The magnetic field induces a current 550 in the flame 584 which flows through the flame between the two electrodes 592, 594. The current 550 induced in the flame 584 interacts with the magnetic field 540 to generate a Lorentz force that opposes the flow of the flame 584. This flame-holding force acts to hold the flame in place.

FIG. 13 shows a turbofan gas turbine engine 500 comprising in flow series an intake 502, a fan section 504, a compressor section 506, a combustion section 508, a turbine section 510 and an exhaust 512. The fan section 502 comprises a fan 514. The compressor section 504 comprises an intermediate pressure compressor 516 and a high pressure compressor 518. The turbine section 510 comprises a high pressure turbine 520, an intermediate pressure turbine 522 and a low pressure turbine 524. The low pressure turbine 524 is arranged to drive the fan 514 via a first shaft 526. The intermediate pressure turbine 522 is arranged to drive the intermediate pressure compressor 516 via a second shaft 528 and the high pressure turbine 520 is arranged to drive the high pressure compressor 518 via a third shaft 530. The combustion section 508 comprises an annular combustion chamber 532 and a plurality of fuel burners 534 are arranged to supply fuel into the annular combustion chamber 532. A fuel supply, fuel tank, 536 is arranged to supply fuel to the fuel burners 534 via a fuel pipe 538. The annular combustion chamber 532 comprises a flameholder according to the present invention as discussed with reference to FIGS. 2 to 12.

Although it has been described that the flameholders are for use with a gas-turbine engine, they may be used with other combustion systems. Examples include, but are not limited to oil burners and pulverised fuel burners used in installations such as power station boilers, space heating boilers and refuse incinerators.

The invention claimed is:

1. A flameholder for holding a flame comprising a flow of combusting fluid, comprising:
   a magnetic-field generator comprising a first pole piece having a cavity within which a second pole piece is located in such a way that an opening is formed between the first and second pole pieces, the opening having an inlet and an outlet, and the opening providing a flow path for the combusting fluid, the magnetic-field generator in use generating a magnetic field across the opening,
   wherein the first pole piece has a first recess and a second recess on an inner surface of the first pole piece that faces the second pole piece, and the second pole piece has a first recess and a second recess on an outer surface of the second pole piece that faces the first pole piece,
   wherein in use the combusting fluid flows in the flow path through the magnetic field such that an electric current is induced in the combusting fluid, thereby generating a force on the combusting fluid that is opposed to a flow direction of the combusting fluid, the induced electric current being in a form of a closed loop in a plane perpendicular to the flow direction of the combusting fluid such that in use the induced electric current can flow in the closed loop entirely within the combusting fluid.

2. A flameholder according to claim 1, wherein the first pole piece is generally annular and the second pole piece is generally cylindrical, the first and second pole pieces being concentric, so that the flow path is annular in the plane perpendicular to the flow direction of the combusting fluid.

3. A flameholder according to claim 1, wherein the magnetic-field generator comprises first and second electromagnets, each including one of the first and the second pole pieces and a winding.

4. A flameholder according to claim 1, wherein the magnetic-field generator generates an alternating magnetic field.

5. A flameholder according to claim 4, wherein the alternating magnetic field is combined with a steady magnetic field which is always in a constant direction.

6. A flameholder according to claim 4, wherein the alternating magnetic field is a combination of two or more frequencies.

7. A flameholder according to claim 1, wherein the magnetic-field generator is arranged to generate a magnetic field that is stronger in a region of the outlet than the inlet.

8. A flameholder according to claim 1, wherein a winding is located in each of the first recess and the second recess of the first pole piece.

9. A flameholder according to claim 8, wherein a winding is located in each of the first recess and the second recess of the second pole piece.

10. A flameholder as claimed in claim 7, wherein the magnetic-field generator is positioned closer to the outlet than the inlet.

11. A flameholder as claimed in claim 10, wherein at least one fuel burner is located within the inlet between the first pole piece and the second pole piece.

12. A flameholder as claimed in claim 11, wherein a plurality of fuel burners are located within the inlet between the first pole piece and the second pole piece.

13. A flameholder as claimed in claim 1, wherein the first pole piece and/or the second pole piece has at least one cooling duct for passage of a cooling fluid to cool the first pole piece and/or the second pole piece.

14. A flameholder as claimed in claim 10, wherein at least one fuel burner is positioned upstream of the magnetic field generator.

15. A flameholder as claimed in claim 12, wherein the inlet has an end cap, the end cap having a plurality of apertures and each aperture has a respective one of the plurality of fuel burners, the outlet has a plurality of spokes extending between the first pole piece and the second pole piece.

16. A gas turbine engine comprising a flameholder according to claim 1.

17. A flameholder for holding a flame comprising a flow of combusting fluid, comprising:
   a magnetic-field generator comprising a first pole piece having a cavity within which a second pole piece is located in such a way that an opening is formed between the first and second pole pieces, the opening having an inlet and an outlet, and the opening providing a flow path for the combusting fluid, the magnetic-field generator in use generating a magnetic field across the opening,
   wherein the magnetic-field generator is arranged to generate a magnetic field that is stronger in a region of the outlet than the inlet, and wherein the magnetic-field generator is positioned closer to the outlet than the inlet,
   wherein a plurality of fuel burners are located within the inlet between the first pole piece and the second pole piece,
   wherein the inlet has an end cap, the end cap having a plurality of apertures and each aperture has a respective one of the plurality of fuel burners, the outlet has a plurality of spokes extending between the first pole piece and the second pole piece,
   wherein each spoke comprises a ferromagnetic core and an insulating refractory coating, and
   wherein in use the combusting fluid flows in the flow path through the magnetic field such that an electric current is induced in the combusting fluid, thereby generating a force on the combusting fluid that is opposed to a flow direction of the combusting fluid, the induced electric current being in the form of a closed loop in a plane perpendicular to the flow direction of the combusting fluid such that in use the induced electric current can flow in the closed loop entirely within the combusting fluid.

18. A method of holding a flame with a flameholder comprising a magnetic-field generator comprising a first pole piece having a cavity within which a second pole piece is located in such a way that an opening is formed between the first and second pole pieces, the opening having an inlet and an outlet, and the opening providing a flow path for a combusting fluid, the magnetic-field generator in use generating a magnetic field across the opening, wherein the first pole piece has a first recess and a second recess on an inner surface of the first pole piece that faces the second pole piece, and the second pole piece has a first recess and a second recess on an outer surface of the second pole piece that faces the first pole piece,
   the method comprising:
      causing a flame comprising a flow of the combusting fluid to flow along the flow path from the inlet to the outlet; and
      generating the magnetic field across the flow of the combusting fluid in such a way that an electric current is induced in the combusting fluid, thereby generating a force on the combusting fluid that is opposed to a flow direction of the combusting fluid, wherein the induced electric current flows in a form of a closed loop in a plane perpendicular to the flow direction of the combusting fluid and the induced electric current flows in the closed loop entirely within the combusting fluid.

19. A method according to claim 18, wherein the closed loop is generally annular.

20. A method according to claim 18, wherein the magnetic field is an alternating magnetic field.

21. A method according to claim 20, wherein the alternating magnetic field is combined with a steady magnetic field that is always in a constant direction.

22. A method according to claim 20, wherein the alternating magnetic field is a combination of two or more frequencies.

23. A method according to claim 18, wherein the magnetic field is stronger in a region of the outlet than the inlet.

* * * * *